United States Patent [19]

Gerbic, deceased et al.

[11] 3,911,941

[45] Oct. 14, 1975

[54] PIPELINE PRESSURE SURGE RELIEF SYSTEM

[75] Inventors: Charles C. Gerbic, deceased, late of San Anselmo, Calif., by Carole A. Gerbic, administratrix; Richard S. Brumm, Orinda, Calif.; Donald M. Allen, Pinole, Calif.

[73] Assignee: Grove Valve and Regulator Company, Oakland, Calif.

[22] Filed: Mar. 5, 1975

[21] Appl. No.: 555,537

Related U.S. Application Data

[63] Continuation of Ser. No. 427,635, Dec. 26, 1973, abandoned.

[52] U.S. Cl.............................. 137/116; 251/61.1
[51] Int. Cl.² ........................................ G05D 11/13
[58] Field of Search ........ 137/115, 116, 117; 251/5, 251/61.1

[56] References Cited
UNITED STATES PATENTS

| | | | |
|---|---|---|---|
| 2,328,902 | 9/1943 | Grove | 251/5 X |
| 2,573,864 | 11/1951 | Moran | 137/115 X |
| 2,650,607 | 9/1953 | Bryant | 251/5 X |
| 3,002,521 | 10/1961 | Greenlees et al. | 137/115 |
| 3,669,142 | 6/1972 | Gerbic | 251/5 X |

*Primary Examiner*—William R. Cline
*Attorney, Agent, or Firm*—Melvin R. Stidham, Esq.

[57] ABSTRACT

The disclosure is of a pipeline surge relief system including a valve opened by upstream pressure against a pilot pressure which is normally maintained at the pressure of the pipeline augmented by a slight biasing force. When a detecting system sense an excessive rate of pressure increase indicating a surge in the pipeline, a valve in the pilot loading line downstream of the detector is closed to maintain the pilot pressure at essentially the pressure of the pipeline prior to the surge whereby the surge will cause the valve to be opened to divert the surging flow to a reservoir.

9 Claims, 1 Drawing Figure

U.S. Patent Oct. 14, 1975 3,911,941
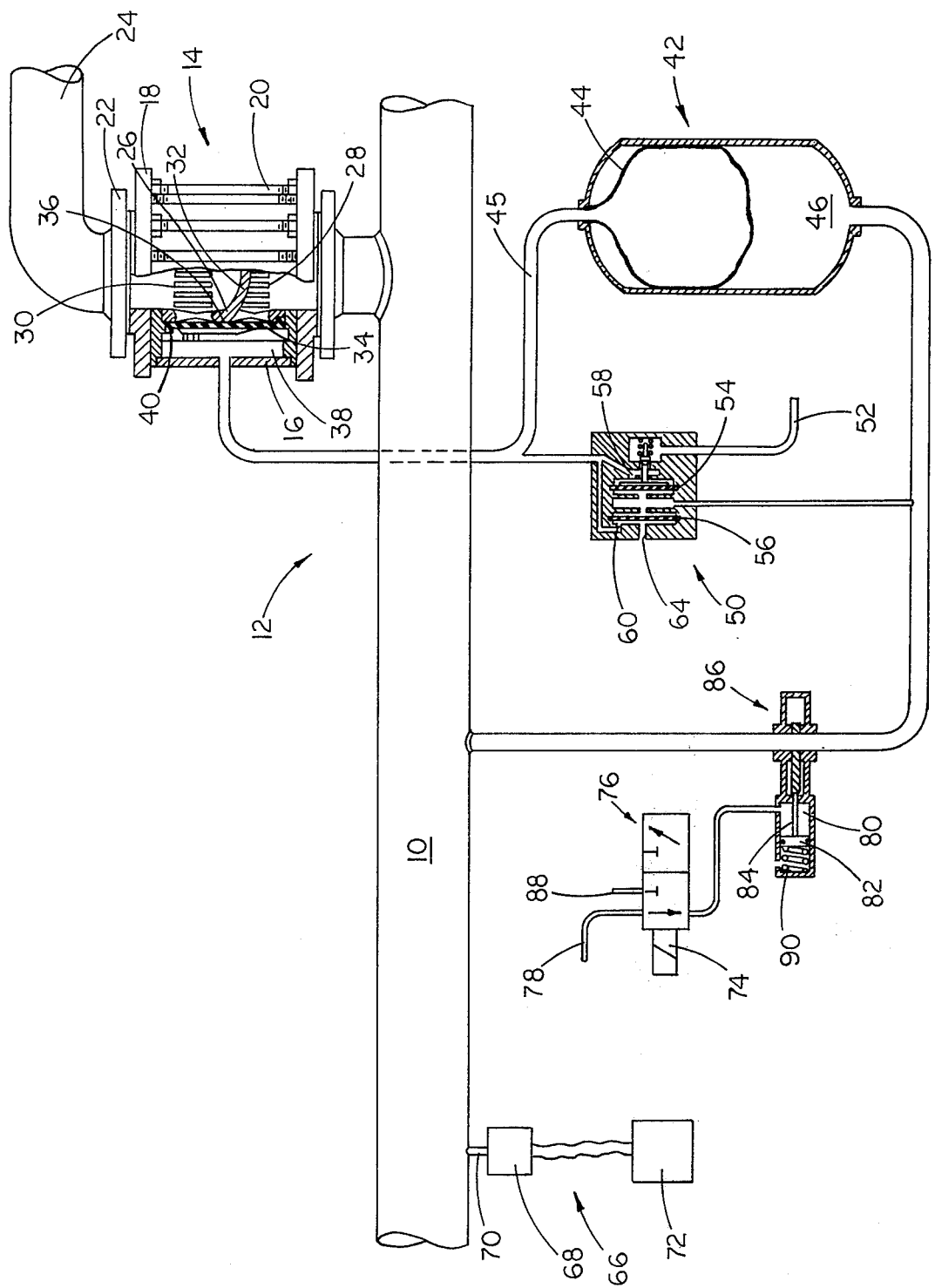

PIPELINE PRESSURE SURGE RELIEF SYSTEM

RELATED APPLICATION

This application is a continuation of co-pending application Ser. No. 427,635 filed Dec. 26, 1973 for "Pipeline Pressure Surge Relief System", abandoned. now

BACKGROUND OF THE INVENTION

In pipeline operation, extreme care must generally be exercised to prevent severe pipeline damages as a result of pressure surges in the line, such as may occur when starting or stopping a pump or opening or closing a valve. Certain pipelines provide for the relief of surges in a line by providing valves which open at a predetermined set pressure, but such valves are necessarily placed at the position along the pipeline where surges are likely to be of greatest intensity, e.g. adjacent a valve or pump or at the bottom of a steep grade.

OBJECTS OF THE INVENTION

It is an object of this invention to provide a surge relief system which may be positioned at any location in the pipeline where it is more conveniently placed and still protect pipeline from surges which will not become critical until a remote portion of the pipeline is reached.

A further object of this invention is to provide a surge relief system which operates in response to excessive rate of pressure increase irrespective of the pressure level.

It is a further object of this invention to provide a pressure surge relief system which detects a surge in the pipeline and immediately conditions a pressure surge relief valve further downstream to divert the surging flow from the pipeline.

Other objects and advantages of this invention will become apparent from the description to follow when read in conjunction with the accompanying drawing.

BRIEF SUMMARY OF THE INVENTION

In carrying out this invention, there is provided a flexible tube surge relief valve having a compressible pilot gas in a jacket surrounding the flexible tube for quick surge relieving action. The flexible tube is stretched over a barrier between inlet and outlet slots so that when upstream pressure exceeds the jacket pressure, the tube is expanded to enable flow around the barrier and through the outlet slots to a reservoir, thus diverting the surging flow. The jacket pressure is normally maintained at the level of the pipeline by asserting the pipeline pressure through a pilot set branch line, against a compressible gas storage vessel. An electronic transducer converts pressure levels into electric voltage signals and a sensing aparatus compares the rate of change of such signals with a pre-set tolerable rate of change. When the pre-set tolerable rate is exceeded, a solenoid valve is energized to activate a control valve in the pilot set branch line to snap the valve closed and maintain the jacket pressure at the level of that in the pipeline ahead of the surge. Hence, when the surge reaches the surge reliever, the jacket pressure will be overcome and the fluid diverted to a reservoir.

BRIEF DESCRIPTION OF THE DRAWING

The drawing is a schematic view of surge relief system embodying features of this invention.

DESCRIPTION OF A PREFERRED EMBODIMENT

Referring to the drawing with greater particularity, there is shown a pipeline 10 designed to transport liquid petroleum or the like under conditions which could produce a sudden surge in pressure, as when a pump (not shown) is activated or deactivated. The surge relieving system 12 of this invention is designed to relieve surges whenever the rate of pressure change exceeds a given level, indicating a dangerous surge. Such pressure increases at rates are relieved through a pressure-responsive valve, as for example an expansible tube valve 14 of the type shown in Bryant U.S. Pat. No. 3,272,470 granted Sept. 13, 1966, and may comprise a cylindrical body shell 16 clamped between two closure plates 18, as by means of studs 20. The closure plates 18 are, in turn, secured by any conventional means to complementary flanges 22 in a pipeline branch 24 with the output thereof directed to a storage reservoir (not shown).

A slotted core 26 is carried within the body 16 and includes spaced, circumferential rows of inlet and outlet slots 28 and 30 on opposite sides of an intermediate barrier 32. A flexible, expansible tube 34 is stretched around the cylindrical sealing surface 36 of the barrier 32, normally to prevent flow from the inlet slots 28 to the outlet slots 30. A pilot, control pressure is normally contained within the chamber 38, and a restraining sleeve 40 with the perforations therein limits the expansion of the rubber tube. The extensive chamber 38 provides plenty of volume for compression of the pilot gas without requiring complete evacuation whereby the surge relief valve 14 will open quickly should pipeline pressure, which is asserted against the interior of the flexible tube 34 through the upstream slots 28, overcome jacket pressure.

In operation, the pilot gas in the control jacket 38 is normally at a level equal to that of the fluid in the pipeline 10 whereby the hoop tension in the stretched tube will maintain a seal around the cylindrical surface 36 of the barrier 32. However, should the pipeline pressure exceed that in the jacket 38, the expansible tube 34 will expand and permit flow through the upstream slots 28, around the barrier 32 and through the downstream slots 32 to the outlet, whereby a quantity of fluid producing the surge will be diverted through line 24 to a reservoir, thus relieving pressure in the pipeline 10 itself.

The fluid in the control jacket 38 is a gas, which being compressible, enables a rapid valve response should a pressure surge occur. The source of gas is an accumulator 42 wherein the gas may be contained in a bag 44 the outside of which 46 is exposed to a liquid at line pressure which is introduced into the accumulator 42 chamber through a pilot set branch line 48. Hence, the pilot pressure in chamber 38 is normally at the pressure in the pipeline 10 and any variations which occur in the pilot set branch line 48 will also be transmitted to the gas in the bag 44 and jacket supply line 45 to maintain the flexible tube 34 sealed despite pressure variations within a tolerable range.

Sensing the pilot gas pressure in the jacket 38 and jacket supply line 45 is a pressure regulator 50 which, on the inlet side 52, is in communication with a gas supply (not shown). One side of each of two diaphragms 54 and 56 is exposed through ports 58 and 60 to pressure in the gas supply line 45, and the opposite sides of the diaphragms 54 and 56 are exposed to pipeline pressure through a small duct 62 in communication with the pilot set branch line 48.

In operation, when the pressure in the jacket gas supply line 45, and hence, the control jacket 38 falls below pipeline pressure the sensed pressure will be overcome by the pipeline pressure acting against the diaphragm 54 to cause the supply line regulator valve 50 to open and deliver the gas from the source of supply to the control jacket 38. If, on the other hand, the pressure in the control jacket 38 become excessive, it will bias the other diaphragm 56 to the right away from its seat to permit escape of control pressure through the vent 64 until the jacket pressure and pipeline pressure are again in balance. Hence, the pressure regulator 50 will compensate any leakage from the control jacket 38 or accumulator 42, which could otherwise compress the accumulator bag 44 to its limit. Similarly, the regulator will compensate for any excessive pressure which may occur through temperature elevation or the like. Otherwise, excessive pressure could expand the bag 44.

The surge reliever system 12 is controlled by a rate sensing sub-system 66 which includes an electronic transducer 68 having a pressure sensor 70 which extends into the pipeline 10. The transducer is a conventional piece of equipment and converts pressure in the pipeline to an electric voltage signal which signal is transmitted to a pressurized sensing apparatus 72 which detects voltage increases and compares the rate of voltage increase with a pre-set tolerable rate of increase. Then, when the rate of voltage increase (and not simply the amount of increase) exceeds the pre-set tolerable level, indicating a surge, a relay (not shown) is closed to energize the solenoid 74 and operate the activator valve 76 to activate the surge relieving system 12. Since the detecting sub-system operates in response to excessive rate of pressure increase, rather than merely pressure level, it may be positioned anywhere along the pipeline 10, even where high pressures are not likely to be experienced. Hence, a surge can be relieved prior to reaching a point in the pipeline wherein it may become critical.

The activator valve 76 is connected through supply line 78 from a gas source (not shown) to a cylinder 80 in which is slidably carried a piston 82 carried on the stem 84 of a pilot pressure control gate valve 86 which is installed in the pipeline branch line 48, which is some distance downstream of the sensing transducer 68. In the position of the activator valve 76 shown, the cylinder 80 is in open communication with the gas supply 78 and the vent 88 is blocked off, whereby the piston 82 is driven to the left in opposition to the spring 90 to hold the pilot pressure set valve 86 in its open position shown. However, should the activator valve 76 be shifted to the left by the solenoid 74 to block off the inlet duct 78 and bring the cylinder 80 into communication with the vent 88, the cylinder will be exhausted to the atmosphere to enable the spring to snap the pilot pressure set valve 86 closed.

In operation, when the pressure in the pipeline 10 detected by the transducer 68 and compared by the pressure sensing apparatus 72 increases at a rate beyond the pre-set tolerable limit, indicating a surge, the solenoid 74 is energized to shut off the gas supply 78 and bring the cylinder 80 into communication with the vent 88 causing the spring to snap the control valve 86 closed. Since the pipeline branch line 48 is downstream of the surge at this instant, the pressure of the liquid in the accumulator 42 is at the pressure in the pipeline 10 prior to the surge, i.e., lower than the surge pressure. This same pressure will be transmitted through the gas bag 44 to the jacket chamber 38. Accordingly, when the surge reaches the surge reliever valve 14, the pressure thereof, transmitted through the upstream slots 28 will overcome the fixed jacket pressure and expand the tube 34 to divert the surge to the reservoir.

While this invention has been described in conjunction with a preferred embodiment thereof, it is obvious that modifications and changes therein may be made by those skilled in the art without departing from the spirit and scope of this invention.

What is claimed as invention is:

1. A pressure surge relief system for a liquid-transporting pipeline comprising:
    a surge relief line adapted for connection from a pipeline to a low pressure zone;
    a surge reliever valve in said surge relief line;
    a pressure responsive member operating said surge reliever valve;
    biasing means urging said pressure-responsive member in one direction to close said surge reliever valve;
    a pilot conduit connected to said surge reliever valve so that fluid therein biases said pressure-responsive member in said one direction;
    means exposing said pressure-responsive member to fluid in said surge relief line to bias it in the opposite direction;
    a gas vessel connected to said pilot conduit;
    a pilot load duct adapted to be connected to said liquid-transporting piepline;
    means for maintaining the pressure in said gas vessel at the pressure in said pilot load duct;
    a pilot pressure set valve in said pilot load duct; and
    means adapted to be installed on said pipeline operative in response to detection of a surge of pressure in said pipeline for moving said set valve toward closed position.

2. The pressure surge relief system defined by Claim 1 wherein said means for maintaining pressure in said gas vessel comprises:
    an accumulator housing;
    a pressure-responsive movable member dividing said housing into two chambers, a liquid chamber and said gas vessel;
    said pilot conduit being connected to said gas vessel; and
    said pilot load duct being connected to said liquid chamber.

3. The pressure surge relief system defined by Claim 2 wherein:
    said gas vessel is an expansible bag.

4. The pressure surge relief system defined by Claim 1 wherein said means for maintaining pressure in said gas vessel comprises:
    a source of pressure gas;
    a gas supply line connected from said gas source to said pilot conduit;
    a gas pressure regulator in said gas supply line including:
    a pressure-biased member;
    said pilot load duct being connected to one side of said pressure-biased member to bias said regulator valve toward open position; and said pilot conduit being connected to the other side of said pressure-responsive member.

5. The pressure surge relief system defined by claim 4 including:
a pressure relief valve connected to and operated by said gas pressure-biased member so as to be opened when pressure on the other side of said pressure-responsive member overcomes pressure on said one side thereof.

6. The pressure relief system defined by claim 1 wherein said surge relief valve is a valve of the expansible tube type comprising:
a housing having inlet and outlet flow passages at opposite ends thereof;
a generally cylindrical core having a series of inlet flow ducts and a series of outlet flow ducts therein in communication with said inlet and outlet flow passages, respectively;
an expansible tube sealed at both ends to said housing and carried on said core to seal therearound;
said expansible tube being normally stretched around said core whereby tube elasticity is said biasing means;
the inner surface of said tube being exposed to fluid in said pipeline through said inlet flow ducts; and
said pilot conduit delivers said control gas to said housing around said expansible tube.

7. The pressure surge relief system defined by claim 6 wherein:
there is a jacket chamber of substantial volume in said housing around said expansible tube, and including:
means in said housing and around said expansible tube for restricting expansion thereof.

8. The pressure surge relief system defined by claim 1 wherein said last-named means comprises:
electrically energized valve operating means operatively connected to said set valve;
sensing transducer means for converting pressure in said pipeline into an electric signal; and
means for energizing said valve operating means when a characteristic of said signal exceeds a predetermined value.

9. The pressure surge relief system defined by claim 8 wherein said valve operating means includes:
a cylindrical actuator;
a piston in said actuator connected to the stem of said pilot pressure set valve;
snap action biasing means urging said piston in one direction to close said set valve; and
a central valve for directing fluid in opposition to said biasing means;
said electrically energized operating means being operative when energized to operate said control valve to vent said actuator.

* * * * *